April 24, 1928.
T. MARTIN
1,667,126
COMBINATION LICENSE PLATE AND TAIL LIGHT
Filed March 17, 1926
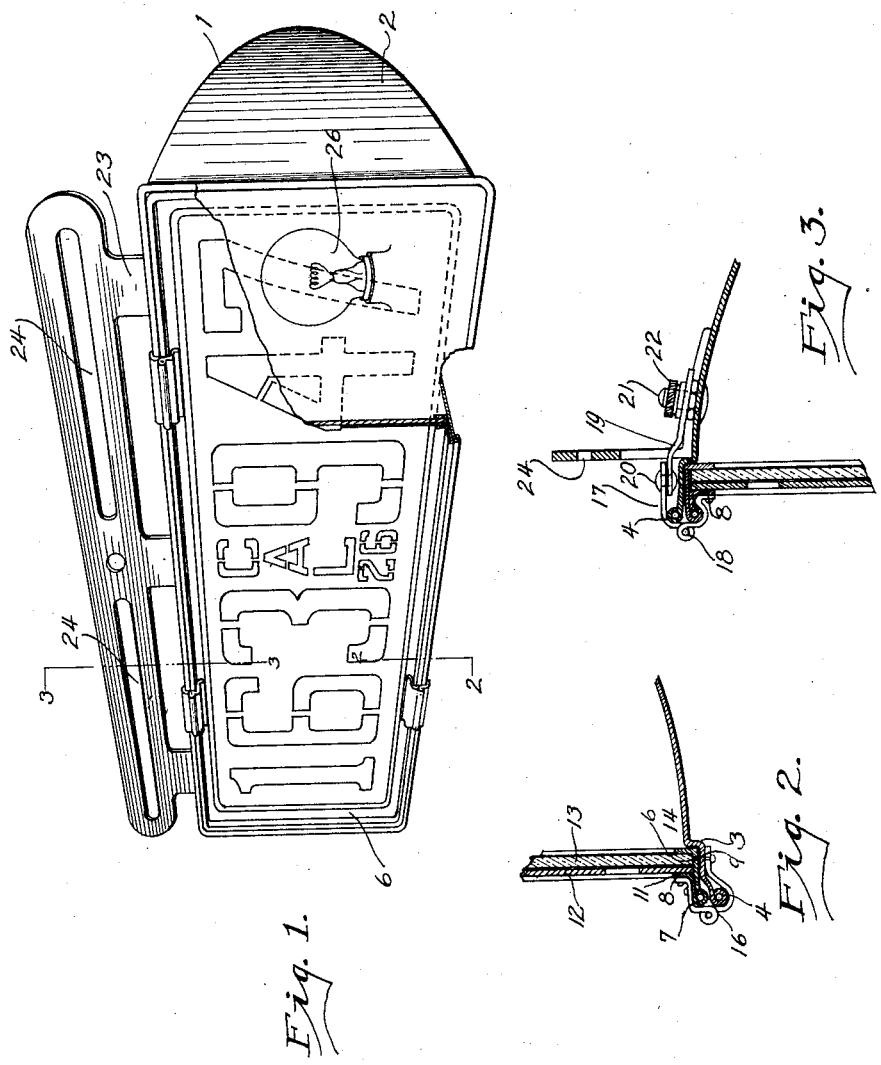
INVENTOR.
THOMAS MARTIN.
BY
ATTORNEYS.

Patented Apr. 24, 1928.

1,667,126

UNITED STATES PATENT OFFICE.

THOMAS MARTIN, OF PIEDMONT, CALIFORNIA, ASSIGNOR OF ONE-HALF TO CHRISTIAN A. JORGENSEN, OF PIEDMONT, CALIFORNIA.

COMBINATION LICENSE PLATE AND TAIL LIGHT.

Application filed March 17, 1926. Serial No. 95,337.

The present invention relates to improvements in a combination license plate and tail light and has for its particular object to provide means whereby the license plate of a motor vehicle may be combined in a single unit with the tail light, the whole device being so constructed that the lamp of the tail light housing shines through perforations in the license plate forming the characters thereon while a red glass is interposed between the lamp and the license plate so that the characters show up red at night time and give the warning signal for which the tail light is intended.

Further objects and advantages of my invention will appear as the specification proceeds.

The preferred form of my invention is illustrated in the accompanying drawing in which Figure 1 shows a perspective view of my tail light and license plate, Figure 2 a vertical section taken along line 2—2 of Figure 1, and Figure 3 a vertical section taken along line 3—3 of Figure 1.

While I have shown only the preferred form of the invention I wish to have it understood that various changes or modifications may be made within the scope of the claims attached hereto without departing from the spirit of the invention.

My light housing 1 is preferably made of sheet iron bent into the curvature shown in Figure 1 to present the top and bottom as well as the front face of the light housing while straight end plates 2 provide the end walls. The housing leaves a rectangular front opening and the walls of the housing are set off near the front edge to form an all around ledge 3. The extremities of the front edges are curled into a continuous roll 4 as illustrated in the drawing.

The ledge is intended to seat the frame 6 which is rectangular in form and comprises a strip of metal bent in cross section as illustrated in Figures 2 and 3 to provide a roll 7 from which two layers 8 and 9 issue the former being bent upwardly to provide a flange 11 and the latter extending horizontally to provide a seat for the plate 12 and the glass 13 while small extensions 14 may be turned upwardly to lie against the rear face of the glass. Hinges 16 are made to surround the rolls 4 and 7 and are secured to the bottom of the housing and the frame in any suitable manner. Fasteners 17 are hinged to the top of the frame as shown at 18 and hooks 19 pivoted thereto as shown at 20 which latter hooks are adapted for engagement with pins 21 and may be tightened thereupon by means of a thumb nut 22.

A suitable bracket 23 rises from the front edge of the top of the housing and may be used for securing the housing to the rear end of the automobile. It is preferably provided with elongated slots 24 through which screws may be threaded into the body of the automobile for holding the housing in place.

The manner of using my invention will be readily understood from the foregoing description. The housing is secured to the rear end of a motor vehicle by means of screws passing through slots 24 in the brackets 23. The light housing has a suitable number of electric lamps 26 supported therein. The license plate 12 and a glass 13 preferably colored red, are supported in the frame 6 and the latter is hinged at the bottom as shown at 7 and provided with fastening means 17 at the top thereof.

The advantages of this arrangement will be readily understood; the light housing forms a firm support for the license plate and prevents the same from vibrating or rattling, while at the same time the lamps in the light housing shed their light through the perforations in the license plate and cause the lettering or numbers on the latter to show up at night time as clearly as at day. The fact that a red glass is interposed between the license plate and the lamps causes the perforations in the license plate to show up in the color customarily adapted as a danger signal.

I claim:

1. A combination license plate and tail light comprising a casing having a rectangular opening therein, the forward lower edge of said casing being offset to provide a transverse ledge and terminating in a rolled edge, the upper edge of said casing being offset to provide a seat and terminating in a rolled edge, a substantially rectangular frame disposed in said rectangular opening and bearing against said seats, said frame having upper and lower transverse rolled forward edges, hinged members connecting said frame to the lower edge of said casing and extending about the rolled lower edge of said casing and of said frame, and fastening elements attached to the upper edge of said frame and of said casing and extending completely about the upper rolled edge of said frame and casing, as and for the purpose specified, and a perforated license plate and glass plate mounted in said frame.

2. A combination license plate and tail light comprising a casing, said casing having a forward lower transverse edge which is offset to provide a seat and which terminates in a downwardly extending rolled edge, said casing having an upper transverse edge which is offset to provide a seat and which terminates in an upwardly rolled transverse edge, said casing having a rectangular opening therein defined by said seat, a frame disposed in said opening bearing against said seat, said frame being formed of sheet metal and in cross section, disclosing metal bent upon itself and provided with retaining flanges, and a forward roll adjacent said first mentioned roll, hinges connecting said frame to said casing and extending about the lower roll on said frame and on said casing and fastening elements attached to said casing and frame, and extending above the upper roll on said casing and on said frame, a license plate and glass disposed between said retaining flanges, said license plate being perforated and means for illuminating said casing.

In testimony whereof I affix my signature.

THOMAS MARTIN.